US010693993B2

(12) United States Patent
Anderson et al.

(10) Patent No.: US 10,693,993 B2
(45) Date of Patent: Jun. 23, 2020

(54) BUILDING SERVICES CONTROL

(71) Applicant: Eight Inc. Design Singapore Pte. Ltd., Singapore (SG)

(72) Inventors: Erik Christian Anderson, Mill Valley, CA (US); Abdul Basit Khan, Singapore (SG); Timothy Mathew Kobe, Singapore (SG); Ryan Marc Tate, Singapore (SG); Michael Ely, Berkeley, CA (US)

(73) Assignee: Eight Inc. Design Singapore Pte. Ltd., Singapore (SG)

( * ) Notice: Subject to any disclaimer, the term of this patent is extended or adjusted under 35 U.S.C. 154(b) by 175 days.

(21) Appl. No.: 15/742,290

(22) PCT Filed: Jul. 6, 2015

(86) PCT No.: PCT/SG2015/050199
§ 371 (c)(1),
(2) Date: Jan. 5, 2018

(87) PCT Pub. No.: WO2017/007418
PCT Pub. Date: Jan. 12, 2017

(65) Prior Publication Data
US 2018/0203425 A1    Jul. 19, 2018

(51) Int. Cl.
*H04L 29/08* (2006.01)
*G06Q 10/10* (2012.01)
(Continued)

(52) U.S. Cl.
CPC ............ *H04L 67/306* (2013.01); *G05B 11/01* (2013.01); *G05B 15/02* (2013.01); *G05B 19/02* (2013.01); *G06Q 10/0631* (2013.01); *G06Q 10/109* (2013.01); *G06Q 10/1093* (2013.01); *H04L 12/282* (2013.01); *H04L 12/2803* (2013.01);
(Continued)

(58) Field of Classification Search
CPC ............... H04L 12/2803; H04L 12/281; H04L 12/2816; H04L 12/2818; H04L 12/282; H04L 12/2823; H04L 2012/2841; H04L 67/125; H04L 67/16; H04L 67/30; H04L 67/34; H04L 12/2012; H04L 12/2841; H04L 67/12; H04L 67/306; H04L 2012/285; G05B 11/01; G05B 15/02; G05B 19/042; G05B 2219/2639; G05B 2219/2642; G05B 19/02; H04W 4/023; H04W 4/38; H04W 64/00; G05F 1/66;
(Continued)

(56) References Cited
U.S. PATENT DOCUMENTS

| 7,904,209 B2 * | 3/2011 | Podgorny | F24F 11/0009 |
| | | | 700/276 |
| 9,360,236 B2 * | 6/2016 | Stewart | F03G 7/04 |
| (Continued) | | | |
| 9,556,856 B2 * | 1/2017 | Stewart | F03G 7/04 |
| 9,915,247 B2 * | 3/2018 | Stewart | F03G 7/04 |
| 2002/0152298 A1 | 10/2002 | Kikta et al. | |
| 2008/0183307 A1 * | 7/2008 | Clayton | H05B 47/175 |
| | | | 700/8 |

*Primary Examiner* — Crystal J Barnes-Bullock
(74) *Attorney, Agent, or Firm* — Porter, Wright, Morris & Arthur LLP

(57) ABSTRACT

A system for controlling building services, the system including a services array supporting a plurality of service devices, an electronic controller that communicates with a client device to determine a selected profile defining service device settings and control the service devices in the services array in accordance with the service device settings defined by the profile, to thereby at least partially control building services.

29 Claims, 16 Drawing Sheets

(51) Int. Cl.
*G06Q 10/06* (2012.01)
*H04L 12/28* (2006.01)
*G05B 11/01* (2006.01)
*G05B 19/02* (2006.01)
*G05B 15/02* (2006.01)

(52) U.S. Cl.
CPC ...... *H04L 67/12* (2013.01); *G05B 2219/2642* (2013.01); *H04L 2012/285* (2013.01)

(58) Field of Classification Search
CPC ............. G06Q 10/0631; G06Q 10/109; G06Q 10/1093
See application file for complete search history.

(56) References Cited

U.S. PATENT DOCUMENTS

| | | | |
|---|---|---|---|
| 2010/0241245 A1* | 9/2010 | Wiemeyer | H04L 12/2834 700/19 |
| 2013/0118094 A1* | 5/2013 | Laspia | E04H 1/00 52/79.1 |
| 2013/0181867 A1* | 7/2013 | Sturdivant | G06Q 30/0241 342/368 |
| 2014/0273986 A1* | 9/2014 | Luna | H04L 67/16 455/414.1 |
| 2014/0344205 A1* | 11/2014 | Luna | G06N 5/025 706/47 |
| 2014/0347181 A1* | 11/2014 | Luna | H04M 1/72569 340/539.22 |
| 2015/0323948 A1* | 11/2015 | Jeong | G05B 15/02 700/291 |

* cited by examiner

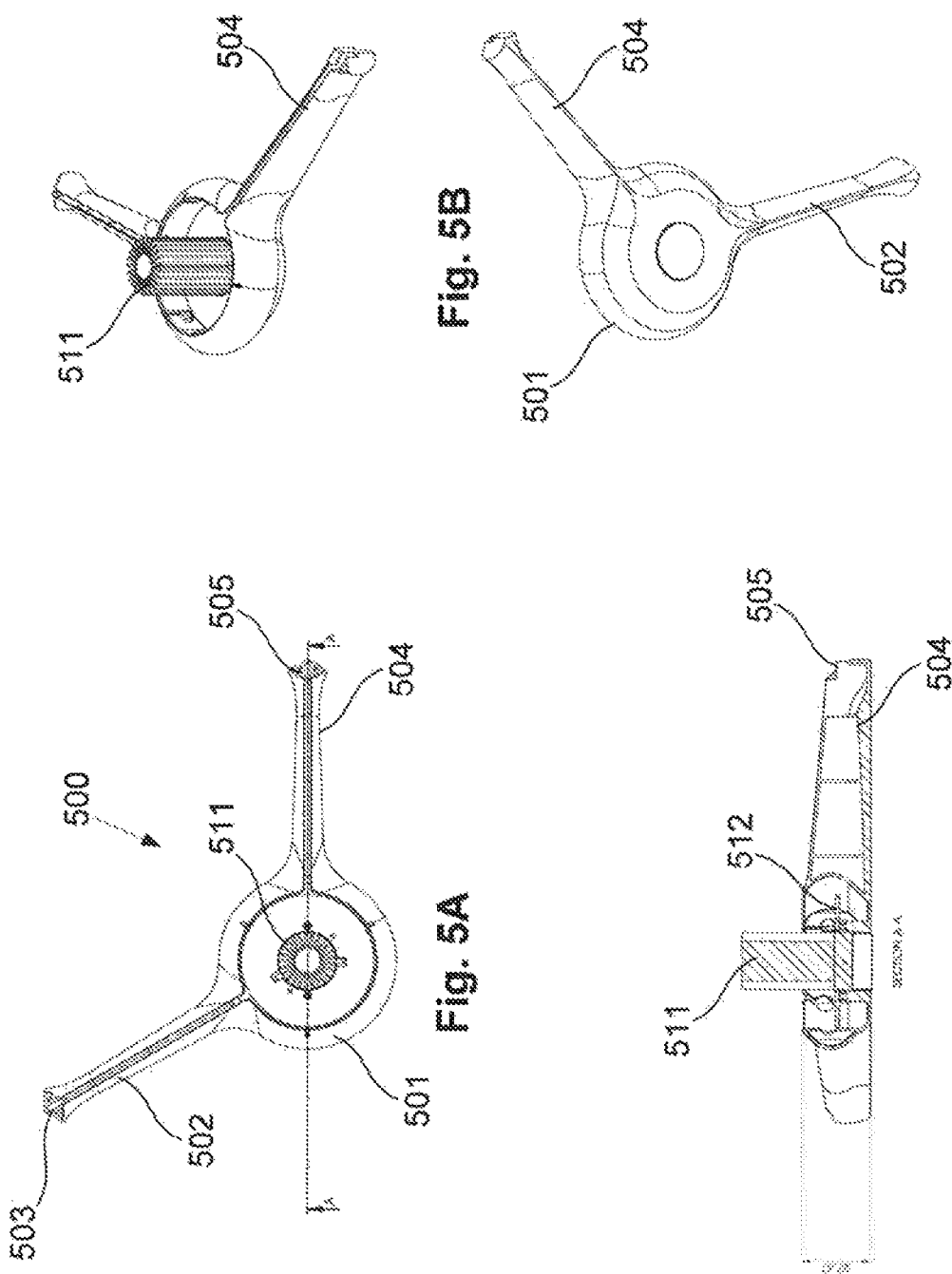

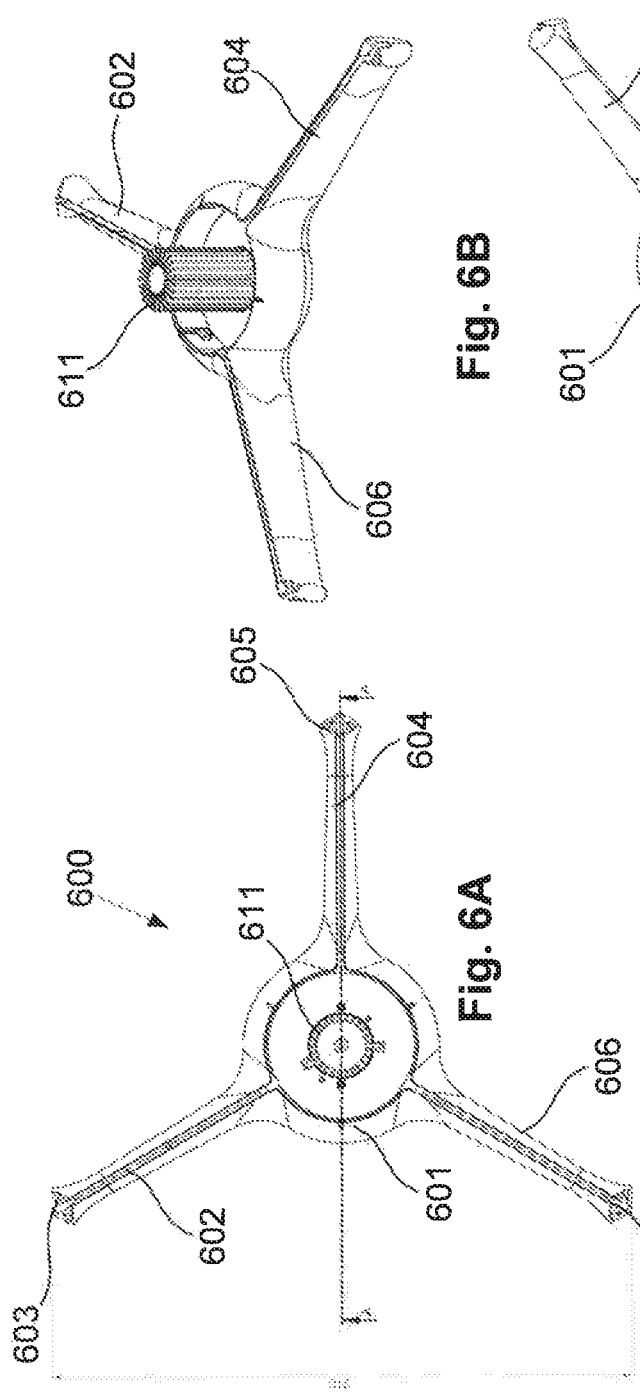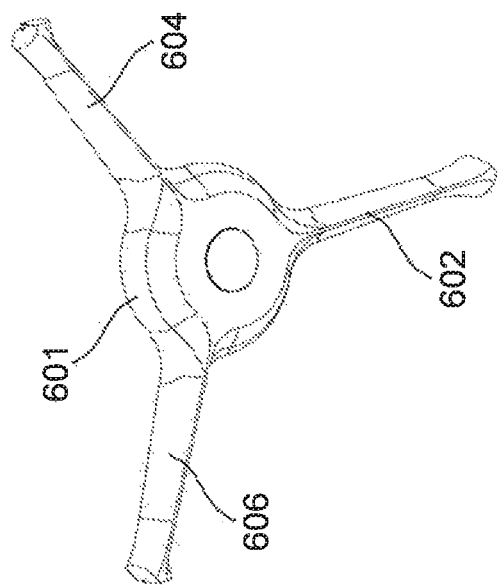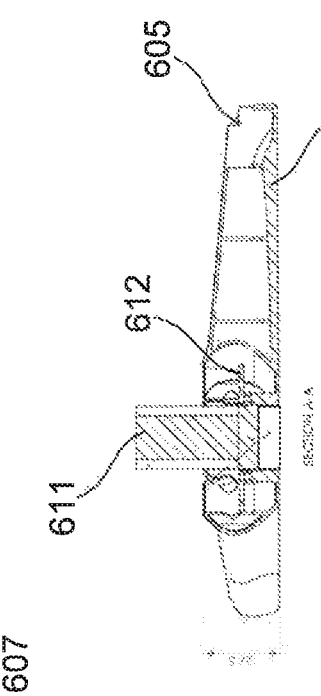

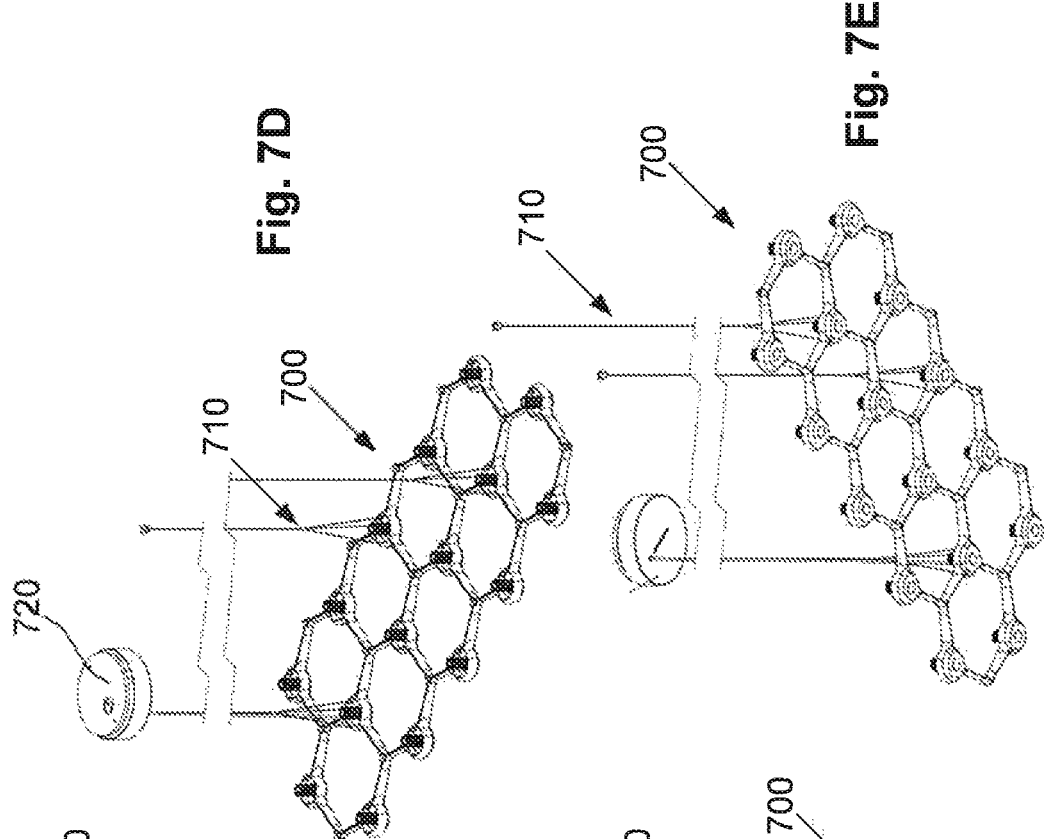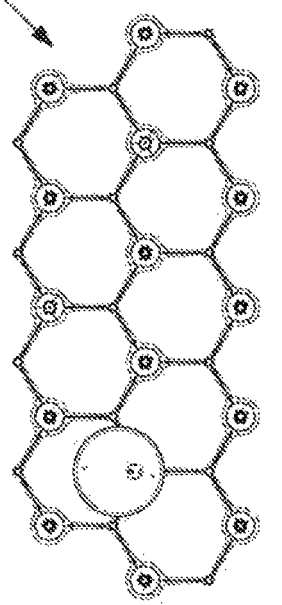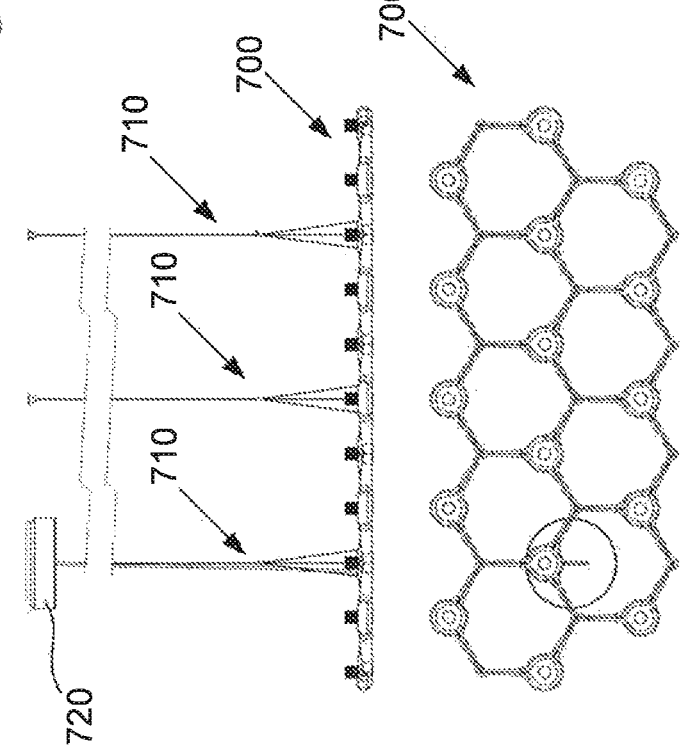

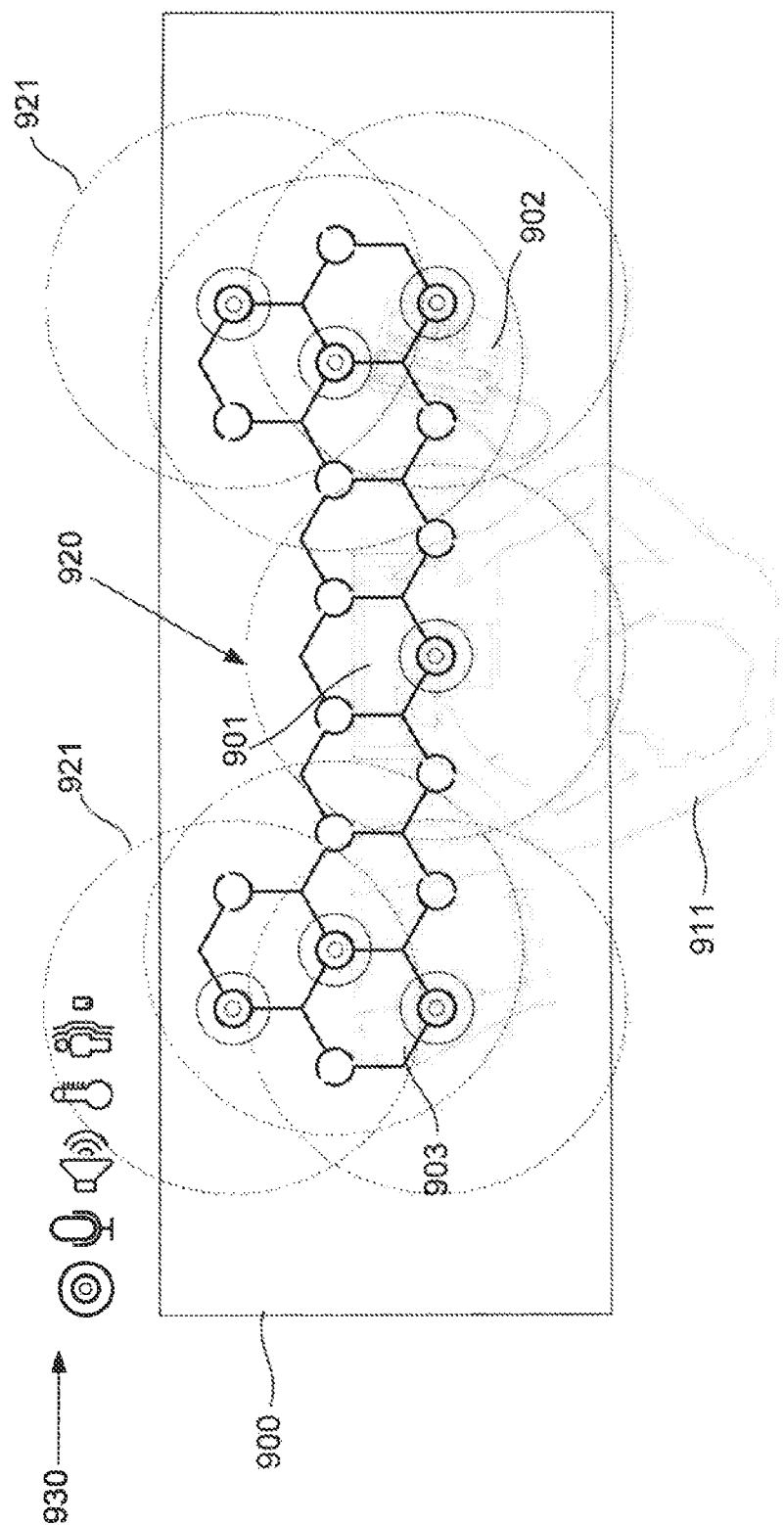

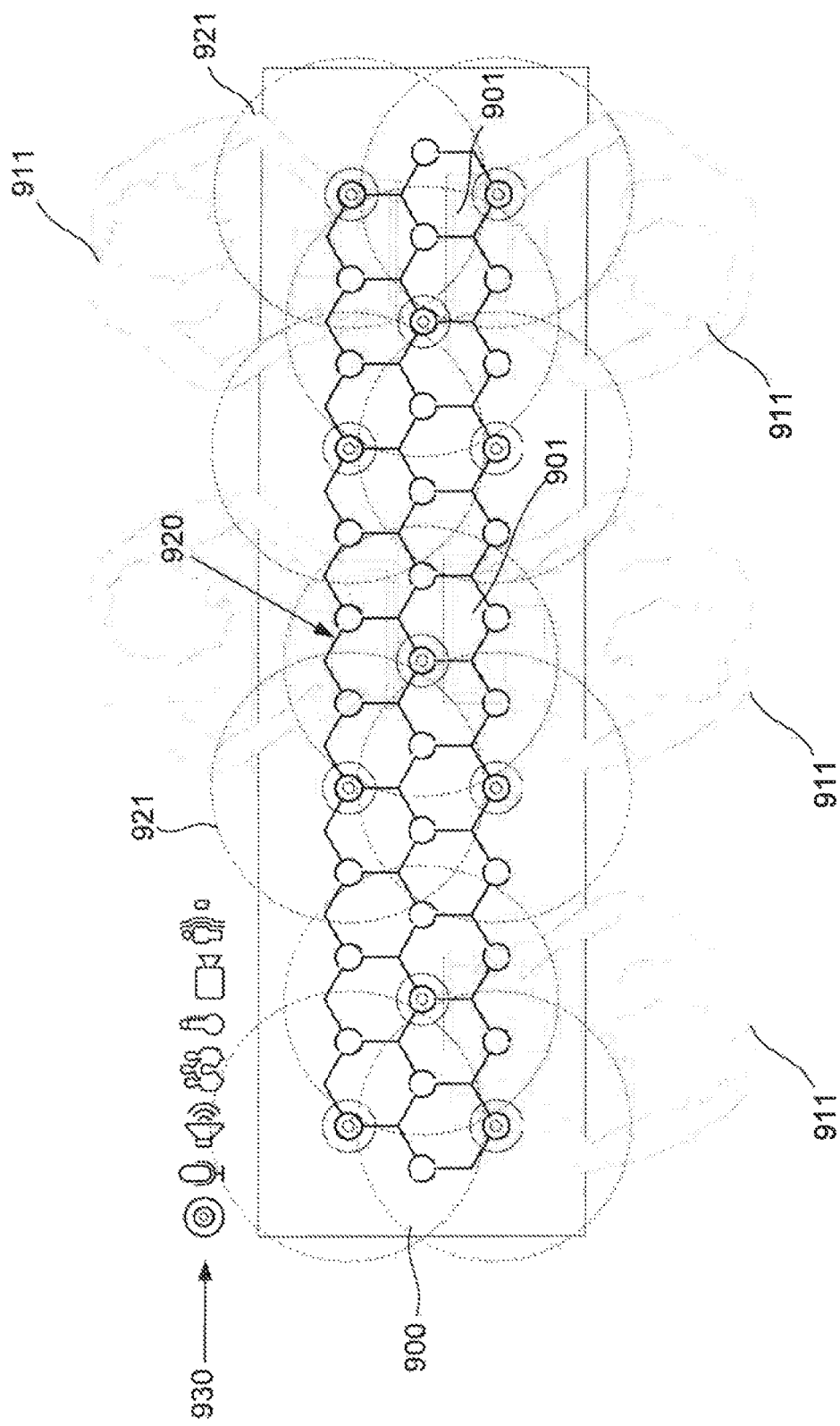

BUILDING SERVICES CONTROL

BACKGROUND OF THE INVENTION

The present invention relates to a method and system for controlling building services, for example to provide an environment suitable for a desired event or task.

DESCRIPTION OF THE PRIOR ART

The reference in this specification to any prior publication (or information derived from it), or to any matter which is known, is not, and should not, be taken as an acknowledgment or admission or any form of suggestion that the prior publication (or information derived from it) or known matter forms part of the common general knowledge in the field of endeavour to which this specification relates.

Traditionally, building systems each have their own infrastructure. Lighting, for example, has been accomplished by dedicated fixtures installed with their own control systems. Similar systems exist for climate control, safety, audio, video, telephony and so forth. With the transformation of many of these systems to digital implementations, there is a significant degree of overlap between these services. Despite this there is no mechanism allowing these to be controlled holistically to achieve a desired working environment.

SUMMARY OF THE PRESENT INVENTION

In one broad form the present invention seeks to provide a system for controlling building services, the system including:
 a) a services array supporting a plurality of service devices;
 b) an electronic controller that communicates with a client device to:
  i) determine a selected profile defining service device settings; and,
  ii) control the service devices in the services array in accordance with the service device settings defined by the profile, to thereby at least partially control building services.

Typically the client device:
 a) determines a selected profile in accordance with user input commands; and,
 b) provides an indication of the selected profile to the controller, the controller being responsive to the indication to determine service device settings.

Typically profiles are stored in the controller and the client device:
 a) communicates with the controller to determine available profiles;
 b) displays an indication of the available profiles to a user; and,
 c) determines user selection of one of the available profiles in accordance with user input commands.

Typically the client device:
 a) determines a scheduled event using an event scheduler;
 b) determines a profile associated with the selected event; and,
 c) provides an indication of the selected profile to the controller, the controller being responsive to the indication to determine service device settings.

Typically the client device:
 a) displays an indication of device settings to a user;
 b) determines modification of device settings in accordance with user input commands; and,
 c) provides an indication of service device settings to the controller in accordance with any modifications.

Typically the client device:
 a) provides an indication of the selected profile to the controller; and,
 b) receives an indication of device settings associated with the selected profile from the controller.

Typically the client device:
 a) displays a representation of the services array; and,
 b) determines device settings at least partially in accordance with user interaction with the representation of the services array.

Typically the service devices in the services array are provided in a defined relative location and the representation is indicative of the defined relative location.

Typically the service devices in the services array are provided in a known relative location and the controller:
 a) communicates with service devices in the services array; and,
 b) determines the defined relative location based on an outcome of the communication.

Typically the service devices include at least one of:
 a) lighting modules;
 b) speakers;
 c) microphones; and,
 d) at least one video display unit.

Typically the service device settings include at least one of:
 a) for lighting modules, colour, brightness, hue, intensity, luminosity and pattern of illumination;
 b) for speakers:
  i) a speaker volume; and,
  ii) a speaker source;
 c) for microphones:
  i) a microphone sensitivity; and,
  ii) a microphone destination.

Typically the lighting modules include LED lighting modules.

Typically the system further controls at least one building service device provided remotely from the services array.

Typically the controller communicates wirelessly with the at least one building service device.

Typically the system includes at least one sensor, and the system controls the service devices at least partially in accordance with signals from the at least one sensor.

Typically the profile defines specific service device settings for different sensors readings, and the controller:
 a) receives signals from a sensor, the signals being indicative of a sensor reading;
 b) determines a service device setting in accordance with the signal; and,
 c) controls the service devices in accordance with the service device setting.

Typically the at least one sensor includes at least one of:
 a) a gesture sensor;
 b) a proximity sensor;
 c) a temperature sensor;
 d) a light sensor; and,
 e) an electrical power sensor.

Typically the controller:
 a) determines an energy usage; and,
 b) at least one of:
  i) provides an indication of the energy usage to the client device, the client device being adapted to display an energy usage indicator to a user, the energy usage indicator being indicative of at least one of:

(1) current energy usage;
(2) historical energy usage; and,
(3) a cost associated with energy usage.
ii) controls at least one service device in accordance with the energy usage.

Typically the services array is adapted to be suspended from a building ceiling.

Typically the controller is provided in a controller housing coupled to at least one of:
a) the ceiling; and,
b) the services array.

Typically the controller housing includes an AC/DC converter for supplying DC power to service devices in the services array.

Typically the controller includes:
a) at least one electronic processing device; and,
b) a memory for storing profiles.

Typically the services array includes a plurality of service devices supported by a frame.

Typically the services array includes a plurality of interconnected array modules.

Typically each array module supports at least one:
a) lighting module;
b) speaker; and,
c) microphone.

Typically each array module includes an array housing having:
a) a hub that supports at least one service device; and,
b) one or more arms for connecting the array module to one or more other array modules.

Typically at least part of each array module is manufactured onsite at least in part using additive manufacturing.

Typically each array module includes:
a) control electronics that controls the at least one service device; and,
b) at least one connector for electrically connecting the control electronics to at least one of:
i) other array modules; and,
ii) the controller.

In one broad form the present invention seeks to provide a method for controlling building services, the method including, in an electronic controller that communicates with a client device:
a) determining a selected profile defining service device settings; and,
b) controlling service devices in a services array in accordance with the service device settings defined by the profile, to thereby at least partially control building services.

BRIEF DESCRIPTION OF THE DRAWINGS

An example of the present invention will now be described with reference to the accompanying drawings, in which:—

FIG. 5A is a schematic plan view of a first example of an array module;

FIG. 5B is a schematic perspective topside view of the array module of FIG. 5A;

FIG. 5C is a schematic cross sectional view of the array module of FIG. 5A;

FIG. 5D is a schematic perspective underside view of the array module of FIG. 5A;

FIG. 6A is a schematic plan view of a second example of an array module;

FIG. 6B is a schematic perspective topside view of the array module of FIG. 6A;

FIG. 6C is a schematic cross sectional view of the array module of FIG. 6A;

FIG. 6D is a schematic perspective underside view of the array module of FIG. 6A;

FIG. 7A is a schematic plan view of a services array including the array modules of FIGS. 5A and 6A;

FIG. 7B is a schematic side view of the services array FIG. 7A;

FIG. 7C is a schematic underside view of the services array of FIG. 7C;

FIG. 7D is a schematic perspective topside view of the services array FIG. 7A;

FIG. 7E is a schematic perspective underside view of the services array of FIG. 7A;

FIG. 9A to 9D are schematic diagrams of examples of various configurations of a services array for different applications;

DETAILED DESCRIPTION OF THE PREFERRED EMBODIMENTS

Figure 1A:
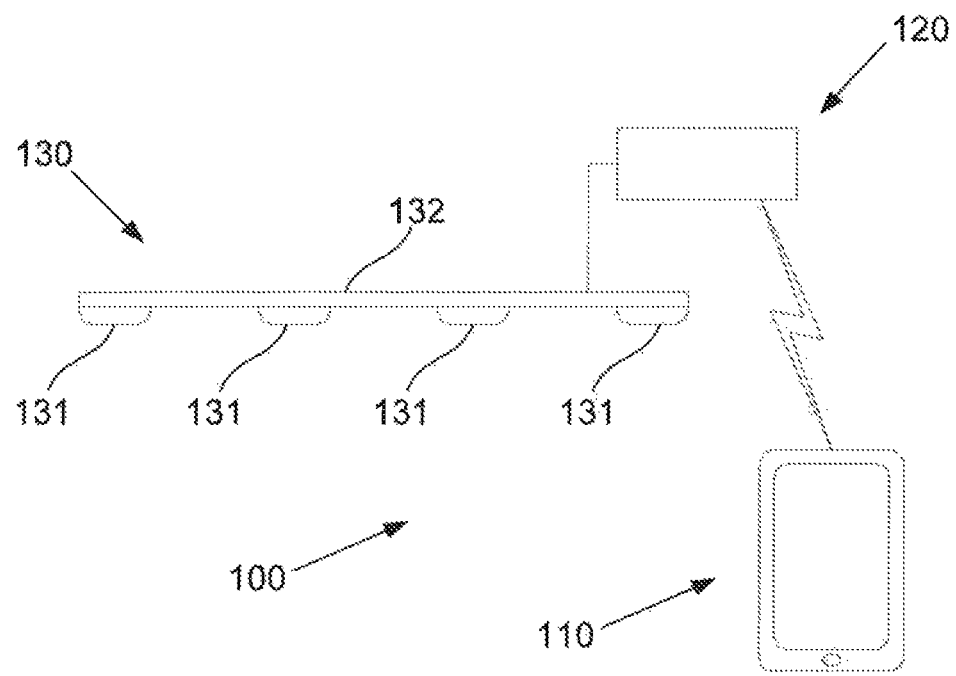
FIG. 1A is a schematic diagram of an example of a system for controlling building services.
Figure 1B:
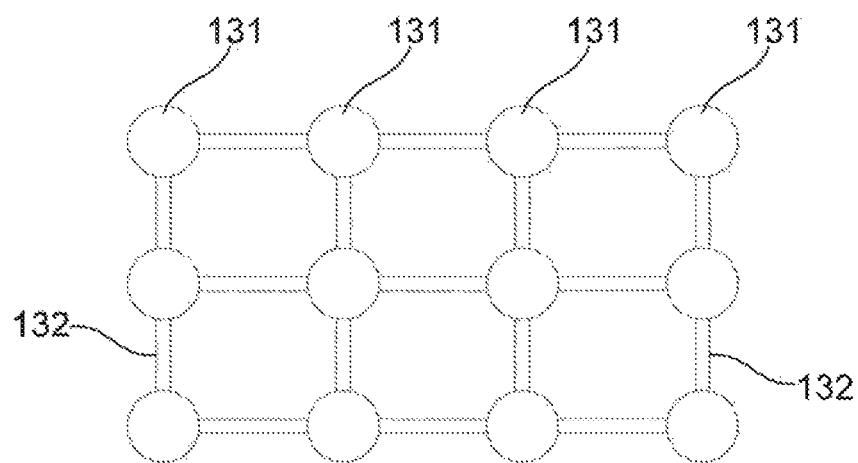
FIG. 1B is a schematic underside view of the services array of FIG. 1A.

An example of a system for controlling a building environment will now be described with reference to FIGS. 1A and 1B.

In this example, the system 100 includes a services array 130 supporting a plurality of service devices 131. The service devices 131 are adapted to provide services within a building and can be of any suitable form, depending on the preferred implementation. For example, the service devices 131 could include lights or lighting modules, speakers, microphones, or the like. Additionally, service devices 131 could include other devices, such as heating and/or cooling systems. Some of the service devices 131 may be supported on a frame 132, although this is not essential, and some or all of the service devices 131 could be provided independently of a frame, for example by having these directly mounted to or integrated within the building structure, as will be described in more detail below.

The system 100 further includes an electronic controller 120 that communicates with a client device 110. The nature of the electronic controller 120 and client device 110 will vary depending on the preferred implementation. Typically the electronic controller includes an electronic processing device that is capable of communicating with the client device 110 and controlling the services devices 131, and in one particular example is a custom system incorporating an electronic processing device capable of performing required functionality.

The client device 110 may be of any suitable form but is typically capable of communicating with the controller 120 and allowing for user interaction, to thereby enable user control of the service devices 131. In one example, the client device 110 is a communications device such as a mobile phone, smart phone, tablet, smart watch, computer system, or the like, although it will be appreciated that a custom processing system could be used, depending on the preferred implementation.

Figure 2:
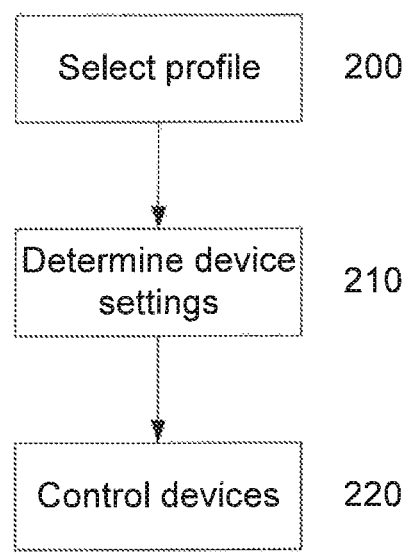
FIG. 2 is a flowchart of an example of a process for controlling building services.

An example of the operation of the system will now be described with reference to FIG. 2.

In this example, at step 200 a selected profile is determined. Each profile is used to define a service device setting associated with each service device 131 in the services array 130, such as a light brightness, microphone sensitivity, speaker volume, or the like, depending on the nature of the service devices 131. The manner in which this is achieved will vary depending on the preferred implementation. Whilst this could include defining user specific quantified settings, more typically this is achieved based on preferences specified by the user in a more subjective manner, which are then interpreted to provide the necessary control over the individual service devices. Thus, for example, this allows a user to define a desired room condition, for example to suit a particular use, with the service devices being controlled accordingly.

The profile is typically selected utilising the client device 110 and this can be performed manually, for example by having the client device display a user interface including a list of available profiles allowing for selection of one by the user, or automatically, for example based on scheduled events, such as meetings or the like. The client device 110 and user interface may also provide associated functionality, including the ability to schedule, create, amend or delete profiles as will be described in more detail below.

At step 210 the controller 120 can determine device settings for the service devices 131, based on the selected profile, for example by retrieving stored device settings, or by receiving an indication of device settings from the client device 110. This allows the controller 120 to control service devices 131 in the services array 130 at step 220, to thereby at least partially control building services. In particular, this allows the service devices to be controlled collectively so as integrate the operation of the different service devices so as to meet the overall desired condition requested by the user.

The above described arrangement provides a number of advantages over existing systems for controlling building services. For example, the service devices 131 are provided as part of a services array 130, which in one example is an integrated unit including a number of service devices 131 provided in a particular configuration. This allows a single controller to be used to provide a high degree of control over the overall provision of services, by independently controlling service devices 131 in the services array 130. This can be based on a known location of the service devices 131, which in turn can be used to provide corresponding high degree of control to the services that are provided at particular locations within a building or room. However, this can be achieved by having the user select a desired condition, with the controller operating to determine settings of each device needed to achieve the desired condition, and then controlling the devices accordingly.

Furthermore, providing the services within an array allows these to be easily retrofitted to an existing building, simply through the installation of one or more service arrays 130, whilst providing the ability to control multiple service devices 131. However, it will be appreciated that this is not essential and the array could be provided by physically separate modules positioned separately within a building, but linked logically via a common controller 120.

Additionally, the above described system allows a client device to communicate with the electronic controller. The electronic controller can store profiles so that any client device can access the profiles via a suitable mechanism, such as an App (application) executed by the client device. In one particular example, the client device can be a user's own communications device, such as a smartphone, tablet, smart watch or the like, allowing any user of a building to utilise their own client device so as to interact with the electronic controller and thereby control building services. This provides a high degree of flexibility, and avoids the need for a custom control device for users to interact with the electronic controller and thereby control building services.

The use of a client device also allows the user to simply define a default preference, through selection of a desired profile, with this automatically being implemented on detection of the user's respective client device. For example, if the user's preferred setting corresponds to a "reading" profile, the user can define this as a default profile selection, in which case their client device can be automatically detected when the user enters a room, thereby triggering the "reading profile", without requiring any input from the user. In this situation, the user can use the client device to select an alternative profile if desired, but otherwise no further input is required.

It will be further appreciated that the user could define a respective default profile for different controllers. For example, the user may define a reading profile for a meeting room, a video conference profile for a boardroom and a computer work profile for their office, so that the devices in each room are controlled in accordance with the respective profile as the user enters and leaves a room.

Additionally and/or alternatively, the ability to select profiles can be built into existing scheduling systems, such as calendars. In this case, a profile could be associated with a calendar entry relevant to an event, such as a meeting, so that at the allocated time, the client device 110 automatically notifies the controller 120 of the relevant profile, causing this to be automatically activated at the start of the meeting time. This again minimises the degree of interaction required by the user, thereby making personalised control of the devices substantially automatic, and yet tailored to a desired usage.

The profiles can be pre-configured with specific service device settings that optimise the characteristics of services provided within the building, such as the illumination, speaker volume, microphone sensitivity, or the like. The profiles can also specify other factors such as allowable energy usage or the like as will be described in more detail below. This arrangement is particularly useful when the system is to be utilised in multi-purpose rooms, such as conference rooms, which can be used for presentations, video conferencing, meetings, or the like, each of which might require a different set of ambient conditions, as it allows users with little or no knowledge of the system to configure building services for a particular application.

Additionally, the system can be configured to handle the implementation of multiple profiles. In one example, this could be achieved by layering or combining profiles, which could be performed by combining settings from multiple different profiles in an intelligent manner to ensure desired outcomes are met for each user. For example, an energy saving profile and specific user profile could be implemented in conjunction. In this case, if the user selects a profile that does not require any restriction on the use of certain service devices, these could then be controlled in accordance with the energy saving profile. Conversely, if the user profile requires devices operate in a manner that increases energy usage, this may be allowed or restricted, depending on the implementation. Similarly, profiles for multiple users could be implemented.

The implementation of multiple profiles could be performed by layering the profiles, with profiles in different layers having different priorities. This could allow, for example, for a manager to be given priority over an employee, or for energy saving to be given priority over user profiles. Additionally and/or alternatively, the controller can use other techniques, such as machine learning, or the like, in order to balance the requirements of different profiles, thereby optimising the settings with a view to ensuring the desired conditions are largely met for each user.

Accordingly, it will be appreciated that above described system provides a system that allows a high degree of control of building services allowing these to be used in an optimal manner for a wide range of scenarios. Control can be manual, through user interaction via a client device, or automatic, for example triggering activation of a particular profile at the commencement time of an event.

A number of further features will now be described.

In one example, the client device 110 determines a selected profile in accordance with user input and provides an indication of the selected profile to the controller 120, with the controller 120 being responsive to the indication to determine service device settings. This can be achieved for example, by having profiles stored in a memory in, or accessible by, the controller 120, allowing the controller 120 to retrieve the device settings from the profiles. In this example, the client device 110 can communicate with the controller 120 to determine available profiles, display an indication of the available profiles to a user and determine user selection of one of the available profiles in accordance with user input commands.

Thus, upon entering a building, the client device 110 can be configured to automatically query any available controllers 120 and access details of profiles associated with the controller 120. A list of these profiles can then be presented to the user, allowing the user to select a suitable one of the profiles and configure the building services accordingly. For example a user may enter a room and be presented with a list of profile options appropriate for the particular room, such as presentation, video conference, reading, writing, or the like, and then simply select one of these. This will then cause the appropriate device settings to be implemented, for example setting the lighting at a particular level, activating microphone and/or speakers, setting a temperature and other ambient conditions as needed. This avoids the need for the user to have any understanding of the operation of the system, whilst ensuring that the device settings are optimised for a particular event, or a task the user is to perform.

The system can also be adapted to control profiles automatically based on a schedule. For example, the client device 110 could determine a scheduled event using an event scheduler, such as a calendar, determine a profile associated with the selected event and provide an indication of the selected profile to the controller 120, with the controller 120 being responsive to the indication to determine appropriate service device settings. Alternatively, the controller 120 could be adapted to maintain an internal schedule, which can be programmed remotely by a client device 110. It will be appreciated that this is particularly advantageous as users will often schedule meetings in calendars using their client device 110, with the above process allowing the user to define either a profile, or an event type that is associated with a corresponding profile, when creating the calendar entry, with this being automatically implemented at an appropriate time.

Additionally, and/or alternatively the client device 110 can display an indication of device settings to the user, determine the modification of device settings in accordance with user input commands and provide an indication of service device settings to the controller 120. As part of this process the client device 110 can provide an indication of a selected profile to the controller 120 and receive an indication of the current device settings associated with the profile from the controller 120. This allows the client device 110 to display current settings, for example associated with a selected profile, and then allow the user to modify these as needed. The modified device settings could be used to update the profile stored in the controller 120, or alternatively to control the service devices 131, so as to temporarily modify the settings, for example to modify light brightness, speaker volume or the like, whilst leaving the original profile unchanged, so that the next time the profile is selected, the original device settings are employed.

As part of the above described processes, the client device 110 can display a representation of the services array 130 and determine device settings as least partially in accordance with user interaction with the representation of the services array 130. In particular, the services devices and services array 130 are typically provided in a defined relative physical location, with the representation being indicative of the relative physical location. Thus, the user is presented with a representation of the service devices 131 that reflects the actual relative physical location of the service devices 131 within the services array 130. The user can then simply select a particular service device and alter the settings associated with this, allowing the user to modify the settings of individual service devices 131 in an intuitive manner, thereby providing independent control over each service devices 131 within the services array 130.

The relative physical location of the service devices 131 can be determined automatically by the controller 120 during a configuration process, for example by having the controller 120 communicate with the service devices 131 and determine the relative physical location based on the outcome of the communication. However, alternatively this information can be pre-programmed into the controller 120, for example by a user by defining the configuration of the services array 130 manually via the client device or by selecting from a number of predefined configurations, or by a manufacturer or supplier of the services array 130 when a user selects a particular services array 130 for installation.

As previously mentioned, a number of service devices 131 can be included in the services array 130, including multiple lighting modules, speakers, microphones or the like, which are typically distributed in a defined configuration throughout the array. Additionally, one or more video display unit, such as a projector, can be provided on the array, allowing the system to be used in presentations or video conferencing type scenarios. Other service devices can include heating/cooling arrangements, or the like.

The service device settings will vary depending on the nature of the particular service devices 131. For example, for lighting modules, the service device settings can include at least one of colour, brightness, hue, intensity, luminosity and/or pattern of illumination. It will be appreciated that this will depend on the nature and capabilities of the individual lighting modules, and in one example these are LED lighting modules with individually controllable LEDs capable of providing one or more colours of illumination. However, this is not essential and any suitable arrangement can be used.

For speakers, service device settings typically include a speaker volume and speaker source. Thus, the speaker source will typically specify a device that is to supply audio signals, with the audio signals being routed to the speakers as required, either wirelessly via Bluetooth or other communications protocols, or via wired connections as required. The speaker settings may also include other settings, such as balance, equalizer settings, locational presence settings, so as to direct sound towards where one or more specific individuals are located, for example using phased-array speakers, or the like.

For microphones, the microphone device settings typically include a microphone sensitivity and/or a microphone destination, to which signals from the microphones are routed, and again this could be via wired or wireless connections. This may also include locational sensitivity, for example for localising sensing for specific users, as well muting of microphones.

For the video display unit, the video display settings could include a video display source, brightness, contrast, resolution or the like.

Additional service devices 131 could include devices for modifying the building environment, such as providing heating/cooling. This could include heat sources such as heat lamps, or fans for generating airflow, which can also be positioned within the services array 130. For example, this can be used to provide differing heating or airflow at different locations within a room, to provide for differential temperatures within a room, so as to localise the temperature based on the presence of users, to thereby accommodate individual preferences. Additionally, and/or alternatively the system can be adapted to control building service devices 131 provided remotely to the services array 130. In this instance, this can be used to control existing heating and/or air conditioning with the controller 120 typically communicating wirelessly with the building service device to control the device as required.

The service devices could also include visual indicators, such as LEDs, indicative of device settings for other service devices. For example, visual indicators could be provided to illustrate whether or not microphones are active.

Typically the system further includes at least one sensor, with the system being adapted to control the service devices 131 at least partially in accordance with signals from the sensor(s). To achieve this, the profile can define specific service device settings for different sensor readings, with the controller operating to receive signals from sensor(s), determine the service device settings in accordance with the signal(s) and control the service devices 131 in accordance with the service device settings. The sensor(s) could be of any appropriate form and could include, but are not limited to, a gesture sensor, proximity sensor, a temperature sensor, an ambient light sensor, or an electrical power sensor.

Thus, for example, the profile could be used to indicate that a particular brightness of illumination should be provided but only in the vicinity of individuals. In this instance, proximity sensor can be used to identify when a person sits at a desk or table and then activates lights in the vicinity of the user, at a brightness specified in the profile, thereby providing the user with required illumination. In the event that the user moves, or an additional user sits at the table, the lighting can be adjusted so each user receives required illumination at their current sitting position.

Similarly, a temperature sensor can be used in order to control the operation of heating and/or heating devices, such as air conditioning or the like, with this optionally also being performed locally, so that cooling/heating is directed to where users are present, thereby avoiding the need to heat/cool an entire building.

The gesture sensor can be utilised to define certain actions associated with particular gestures, so that for example a particular gesture can be used to dim or brighten lights, increase or decrease speaker volume and/or microphone sensitivity. This can therefore be provided to allow user interaction with the service devices 131 independent of the client device 110. In this instance, the client device 110 could be used to select a profile, with subsequent actions being controlled based on the location of, and/or gestures made by, the user.

Additionally, the sensor could be used to identify individuals, allowing control over the service devices to be performed based on the location of specific users within the environment. Detection of the presence and location of individual users could be achieved using any suitable technique, such as detecting the location of the client device associated with a user, through facial recognition techniques, or through the location of another identifying device, such as an NFC enabled device, or the like. It will be appreciated that this allows settings and in particular the profile used to be controlled not only based on which user's are present within a room, but also the user's specific location. By way of an example, if a number of individuals are sat at a conference room table, the lighting could be adjusted for each individual user based on their currently selected profile, with the lighting being automatically adjusted if users move, for example to change seating position.

The electrical power sensor can also be used to monitor power utilised by the services array 130. In this instance, the controller 120 can determine energy usage and use this either to provide an indication of the energy usage to the client device 110, so that this can be displayed to a user, or to control at least one service device 131 in accordance with the energy usage. Thus, this allows the controller to automatically perform control of the service devices 131 to minimise or optimise energy usage, with energy usage also being optionally displayed to a user, allowing users to monitor energy usage of a current profile. The energy usage can be a current usage but can also include historical energy usage, such as a graph of energy usage over time, which could be displayed together with an indication of a particular profile or device settings in use at a relevant time. Additionally, and/or alternatively a cost associated with the energy usage could also be displayed.

The services array 130 is typically adapted to be suspended from a building ceiling. In this case, the controller can be provided in a control housing coupled to either the ceiling or services array 130. This provides a convenient location in the vicinity of the services array 130, minimising additional wiring required, and allowing for power and/or communications to be provided via wired connections. For example, the control housing can include an AC-to-DC converter for supplying DC power to service devices 131 in the services array 130. This eases installation and operation of the services array 130, avoiding the need for AC power certified wiring to be provided in the services array 130.

However, this is not essential, and other arrangements can be provided. For example, the system could be wall mounted, or could be supported by a stand or other support, for example to allow for desktop mounted arrangements, standing lamp configurations or the like to be used.

The controller 120 typically includes at least one electronic processing device and a memory for storing profiles, as well as one or more interfaces for communicating with the client device 110 and service devices 131 in the services array 130. It will be appreciated from this that the controller 120 can be of any suitable form, as will be described in more detail below.

The services array 130 can include a plurality of service devices 131 supported by a frame 132. The frame 312 can be of any suitable form but in one example is made in part by a plurality of interconnected array modules. This allows individual modules to be connected together to provide a high degree of flexibility regarding the overall physical configuration of the services array 130, allowing this to be incorporated in a wide range of different buildings.

Each array module can typically support one or more of a lighting module, a speaker, a microphone and one or more sensors, and in one particular example supports each of these service devices 131. Additionally, one or more modules may also support heater/cooler, fan, video projector. It will be appreciated however that this will depend upon the preferred configuration, and in some cases array modules will be provided with no service devices or sensors.

The array modules can be of any suitable form, but in one example include an array housing having a hub that supports the at least one service device, and one or more arms for connecting the array module to one or more other array modules. This allows a number of modules to be selectively interconnected so as to form the array and specific examples of array modules and arrays will be described in more detail below. The use of a modular arrangement of this form facilitates construction, and in particular allows a variety of construction techniques to be used. For example, whilst array modules could be constructed in a factory and shipped to site, alternatively the array modules could be manufactured at least in part on site using additive manufacturing techniques such as 3D printing. In this scenario, the array module housings could be printed, with supporting electronics, such module controllers, wiring, electrical connectors or the like, being shipped to site and installed into the printed array modules as required.

Accordingly, it will be appreciated that the above described system provides a versatile arrangement for allowing building services to be controlled. In one particular example, this can be used to allow arrays to be retrofitted within existing buildings, with the array being custom designed to suit the specific physical layout and intended use of the building. The array can then be controlled using an App or other similar interface, provided on a client device such as a smartphone, smart watch, tablet or the like, which allows users to select predefined profiles and optionally modify the settings associated with a profile, as required. This enables each user to easily interact with and control the array, ensure that services are provided in a manner which is most suitable for the task being performed by the user. This ensures that desired task outcomes are more easily achieved, whilst minimising energy usage.

Figure 3:
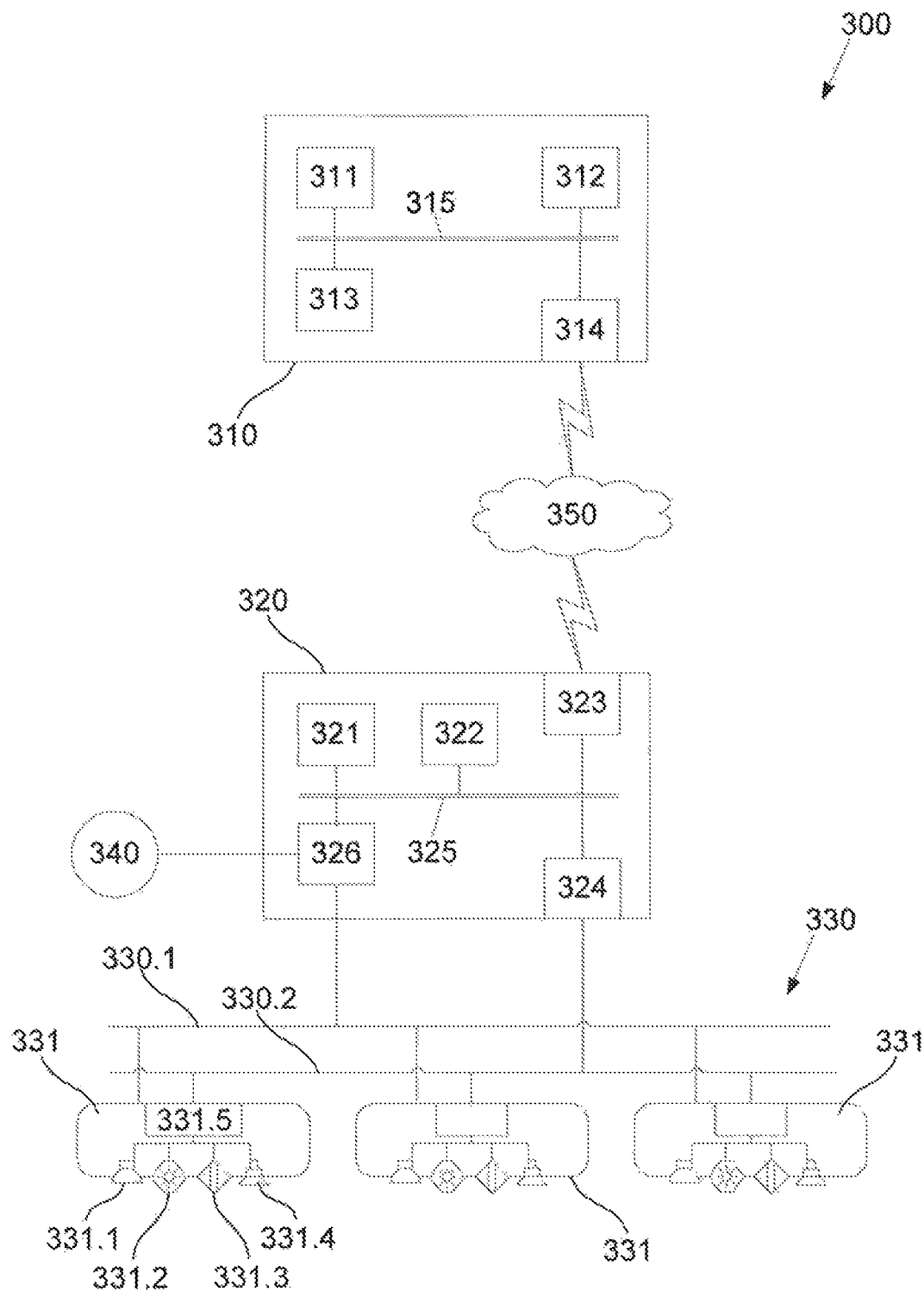
FIG. 3 is a schematic diagram of a second example of a system for controlling building services.

A further more in depth example of a system for controlling building services will now be described with reference to FIG. 3.

In this example, the apparatus 300 includes a client device 310. The client device typically includes a microprocessor 311, a memory 312, an input/output device 313, such as keyboard and/or touch screen, and an external interface 314, interconnected via a bus 315.

In this example the external interface 314 can be utilised for connecting the client device 310 to peripheral devices, other computing devices, one or more communications networks, such as 802.11 networks, the Internet, LANs, WANs, or the like. In particular, the external interface 314 is at least adapted to provide connectivity to a controller 320, either directly via a point-to-point connection, or via an intermediate communications network 350, such as a wireless network or the like. Although a single external interface 314 is shown, this is for the purpose of example only, and in practice, multiple interfaces using various methods, such as USB, micro USB, Lightening, Bluetooth, GSM, 3G, 4G, 5G, NFC, wireless, or the like, may be provided.

In use, the microprocessor 311 executes instructions in the form of applications software stored in the memory 312 to allow the required processes to be performed, including communicating with the controller 320. The applications software may include one or more software modules, and may be executed in a suitable execution environment, such as an operating system environment, or the like.

Accordingly, it will be appreciated that the client device 310 may be formed from any suitable device, such as a computer system or the like, but is more typically a portable communications device such as a tablet, smartphone, smart watch, or the like. However, it will also be understood that the client device could be any electronic processing device such as a microprocessor, microchip processor, logic gate configuration, firmware optionally associated with implementing logic such as an FPGA (Field Programmable Gate Array), or any other electronic device, system or arrangement.

The system further includes a controller 320, which in this example includes a microprocessor 321, a memory 322, a first external interface 323, and second external interface 324, interconnected via a bus 325.

In this example the first external interface 323 can be utilised for connecting the controller 320 to peripheral devices, other computing devices, one or more communications networks, such as 802.11 networks, the Internet, LANs, WANs, or the like. In particular, the external interface 323 is at least adapted to provide connectivity to the client device 310, either directly via a point-to-point connection, or via an intermediate communications network 350, such as a wireless network or the like. Additionally, the first external interface 323 may be adapted to provide onward connectivity to other devices, such as a video conferencing system, or the like, as will be described in more detail below. Although a single first external interface 323 is shown, this is for the purpose of example only, and in practice, multiple interfaces using various methods, such as Ethernet, USB, micro USB, Lightening, Bluetooth, GSM, 3G, 4G, 5G, NFC, wireless, or the like, may be provided.

The second external interface 324 is utilised for communication with services array 330. In one example, this is provided via a wired connection using a communications bus 330.2, which is provided within the services array 330. However, this could alternatively be via dedicated wireless connections, such as Bluetooth connections, or using other techniques, as will be described in more detail below.

Additionally, the controller 320 includes an AC-to-DC converter 326 coupled to an AC power supply 340. In this example the AC-to-DC converter provides DC power to a DC bus 330.1 provided within the services array 330, allowing DC power to be supplied to service devices within the services array 330. It will be appreciated that whilst separate DC power and communications buses 330.1, 330.2 are shown, this is not essential and alternatively communications could be achieved by injecting control signals into the DC power signal, allowing communications to be achieved via the DC power bus, as will be appreciated by persons skilled in the art. Additionally, whilst reference is made to power and communications buses, this is not intended to be limiting, and any suitable power and/or communications distribution could be used.

In use, the microprocessor 321 executes instructions in the form of applications software stored in the memory 322 to allow the required processes to be performed, including communicating with the client device 310, retrieving profiles stored in the memory 322, and generating control signals for controlling the service devices. The applications software may include one or more software modules, and may be executed in a suitable execution environment, such as an operating system environment, or the like.

Accordingly, it will be appreciated that the controller 320 may be formed from any suitable processing device, but is typically a custom controller including an electronic processing device such as a microprocessor, microchip processor, logic gate configuration, firmware optionally associated with implementing logic such as an FPGA (Field Programmable Gate Array), or any other electronic device, system or arrangement.

In this example, the services array 330 include a number of service modules 331, examples of which are described in more detail below. For the purpose of illustration, in this example, each service module includes a microphone 331.1, a lighting module 331.2, a proximity sensor 331.3 and a speaker 331.4. It will be appreciated whilst the use of a microphone, lighting module, proximity sensor and speaker is used, this is for the purpose of illustration only and is not intended to be limiting.

Additionally, each module can include a module controller 331.5, which is coupled to the control signal bus 330.2 and the service devices 331.1, 331.2, 331.3, 331.4. The module controller is typically an electronic processing device, such as FPGA or similar, that allows for communications to be routed between the controller 320 and the service devices 331.1, 331.2, 331.3, 331.4. In one particular example, the module controllers 331.5 are typically individually addressable, allowing the controller 320 to communicate with module controllers 331.5, separately or collectively, depending on the current profile requirements. However, the use of a module controller is not necessarily required, and direct communications between controller 320 and the service devices 331.1, 331.2, 331.3, 331.4 could be used.

Figure 4:
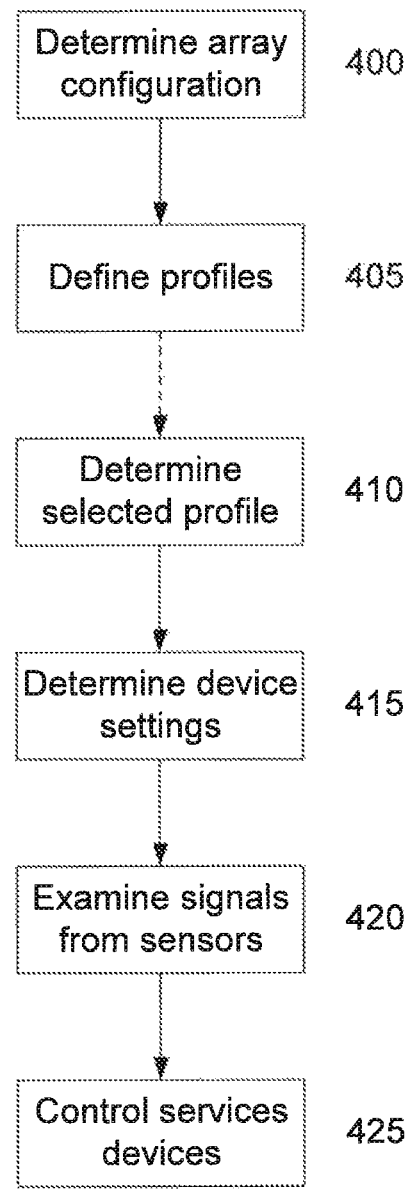
FIG. 4 is a flowchart of a second example of a method for controlling building services.

An example of the operation of the system of FIG. 3 will now be described with reference to FIG. 4.

In this example, at step 400, the controller 320 determines an array configuration. The array configuration could be determined in any appropriate manner and this could include having the controller 320 communicate with the module controllers 331.5, allowing these to determine their relative location within the array 330 and provide this information to the controller 320. Alternatively, this could be performed by programming the controller 320 and storing an array configuration in the memory 322, for example when the array is initially constructed and/or installed.

At step 405, one or more profiles are defined, in particular by defining particular device settings for each profile. The profiles can be defined in a number of ways. For example, default profiles could be provided by the manufacturer/designer/supplier of the array 330, with these being stored in memory 322 for retrieval as required. This could also include not only individual profiles, but also layers of one or more profiles, allowing profiles to be assigned to respective layers, thereby allowing the control of multiple profiles in accordance with a control layer hierarchy.

In this regard, layers of profiles can be used to allow a controller to control room services based on multiple profiles in accordance with a control layer hierarchy, allowing the controller to recognize individual preferences and control the room accordingly, so as to optimise the settings to best meet different requirements. For example, in a room where multiple individuals are present, such as conference rooms, hotel spaces, such as lobbies or the like, the controller attempts to adjust or blend layers of profiles to create a balanced desired condition, in an attempt to satisfy each of the users.

Additionally and/or alternatively profiles and/or layers of profiles could be defined by a user utilising the client device 310. For example, the client device 310 could display a user interface allowing the user to select to create a new profile, and then define individual device settings for each array module 331, as will be described in more detail below.

As a further alternative, profiles and/or layers of profiles could be defined by a third party and made available for download from a remote source, such as from the Internet. Thus, for example, manufacturers of equipment such as video conferencing equipment could provide profiles that are specifically adapted to optimise the array for use with their equipment. This could include defining settings for connecting the equipment to microphones and speakers, as well as defining optimum illumination settings for the given video equipment.

At step 410 when the system is then used a selected profile will be determined, typically by having the client device 310 display a list of available profiles to the user and having the user select one of the available profiles from the list. An indication of the selected profile can then be provided to the controller 320, allowing the controller 320 to retrieve associated device settings from the memory 322 at step 415.

At step 420, the controller 320 examines signals from sensors, such as the proximity sensor 331.3, and then generates control signals to control the service devices at step 425. In particular, the controller 320 will generate control signals which are transferred to each module controller 331.5, allowing the module controller 331.5 to control the individual service devices within the respective module array.

As part of this process, the controller 320 may route signals between external devices and the service devices, for example to transfer audio signals to speakers 331.4, or from microphones 331.1. This can be achieved by receiving the signals via the second external interface 324 and then routing these via the first external interface 323, or alternatively a separate routing device, such as a network switch, or the like.

An example of first and second array modules will now be shown with reference to FIGS. 5A to 5D and 6A to 6D.

In the example of FIGS. 5A to 5D, each first array module 500 includes a hub 501 and two arms 502, 504 extending radially outwardly from the hub. The arms 502, 504 are integrally formed with the hub 501 and circumferentially spaced by 120°. An outer end of each arm 502, 504 terminates in a respective physical connector 503, 505, which allows the arms 502, 504 to be mechanically connected to arms of adjacent array module, for example using a clip-fit, friction-fit, interference-fit, mechanical fastener, or the like.

The array module hub 501 supports one or more service devices 511, typically in appropriate recesses, openings or other fittings, and an electronic circuit board 512 supporting the respective module controller 331.5. Electrical wiring operating as the DC power and communications buses 330.1, 330.2 are typically connected to the circuit board 512 and extend along the arms to 502, 504 and terminate at electrical connectors (not shown) provided within the physical connector 503, 505, allowing the wiring in adjacent modules to be electrically interconnected when the modules are mechanically coupled together.

In the example shown in FIG. 6A to 6D, the second array module 600 is substantially similar to the first array module 500 described above, albeit with three arms 602, 604, 606, with corresponding connectors 603, 605, 607 extending radially outwardly from the hub 601 and circumferentially spaced by 120°. Like the first array module 500, the second array module includes an array module hub 601 which supports one or more service devices 611 and an electronic circuit board 612.

In use, the first and second array modules 500, 600 can be interconnected to form a hexagonal array 700, including a number of hubs 501, 601 supporting respective service devices, as shown in FIGS. 7A to 7E.

Once constructed, the array 700 can be suspended from a ceiling via suspension ropes or cables 710 attached to selected ones of the hubs 501, 601. Additionally, a controller 720 is attached to the ceiling with appropriate electrical connector cables being connected to one of the hubs 501, 601, allowing power/or communications to be electrically coupled to the services array.

It will be appreciated that the above described arrangement therefore provides a scalable configuration, in which any arrangement of modules can be used to construct an array of a desired size and shape. Furthermore, whilst the above described arrays provide a hexagonal arrangement, this is not essential, and any suitable configuration can be provided, depending on the arrangement of the array modules.

Figure 8A:
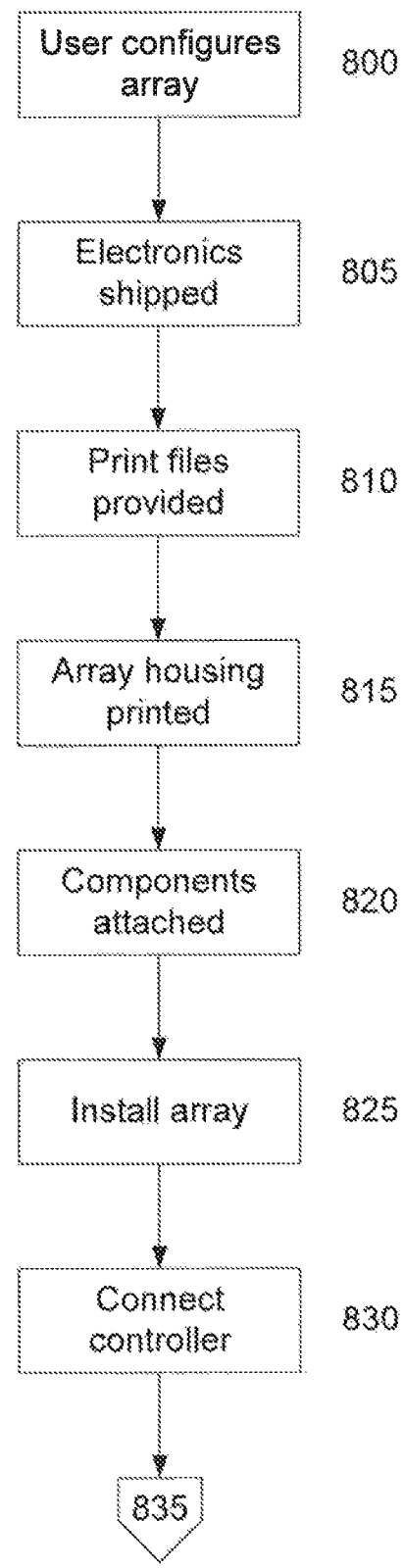
FIGS. 8A and 8B are a flowchart of an example of a process for configuring a system for controlling building services.
Figure 8B:
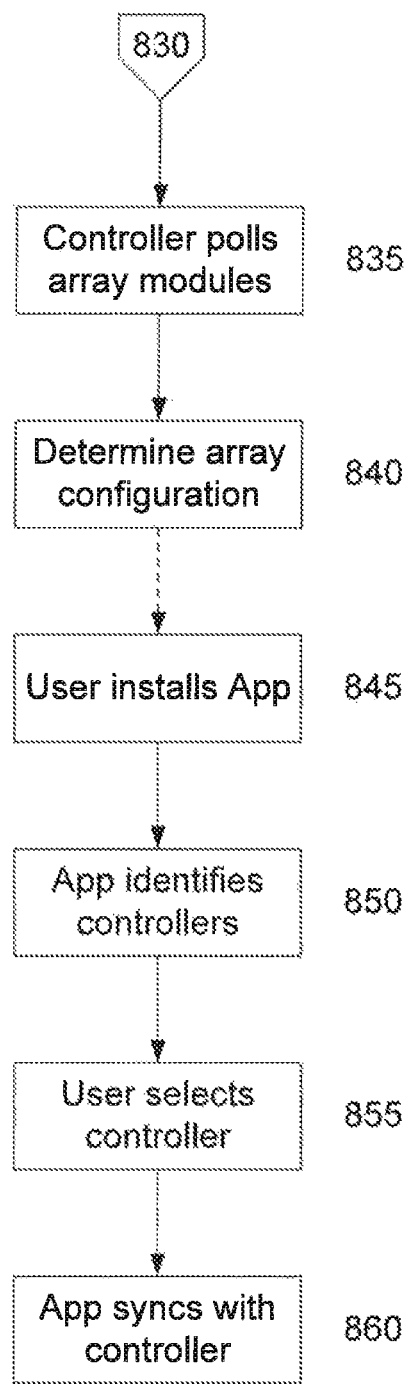

An example of the process for installing and configuring an array 700 will now be described with reference to FIGS. 8A and 8B.

In this example, at step 800 the user configures an array, in particular selecting a desired physical configuration for the array 700, including a particular combination of the first and second array modules 500, 600, and specifying the types and optionally distribution of services devices required. The array could be of any particular size depending on the client's requirements and accordingly this process will typically involve having a user consider the physical dimensions of the room in which the array will be installed, and how the array will be used within the room. From this, the user will select a size of array and shape of the array, and where within the array specific service devices will be required.

Examples of different array configurations for different applications, including different arrangements of users and different uses for a single user, are shown in FIGS. 9A to 9D.

Figure 9A:
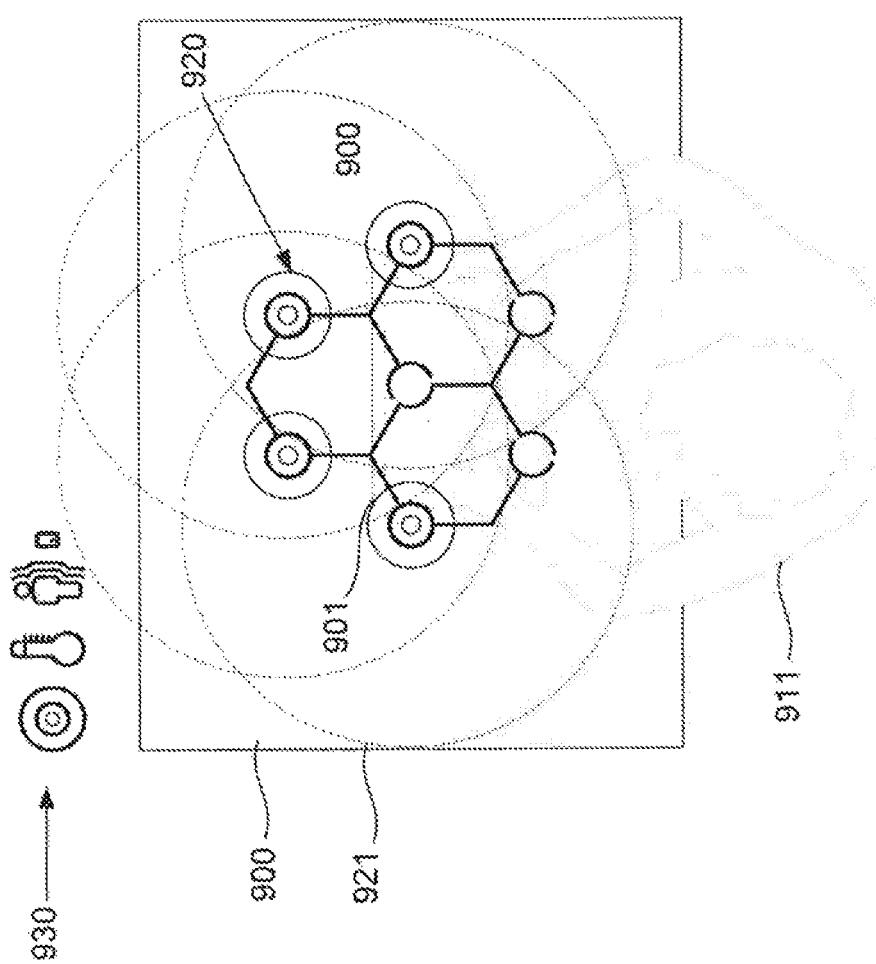

In the example of FIG. 9A, a single desk 900 is used with a single computer 901 by a single user 911. An example suitable array 920 includes seven array modules positioned directly above the computer 901. The array includes service devices represented by the icons 930, which in this example includes four lighting modules that provide illumination over the regions 921, as well as additional temperature and proximity sensors.

Figure 9B:
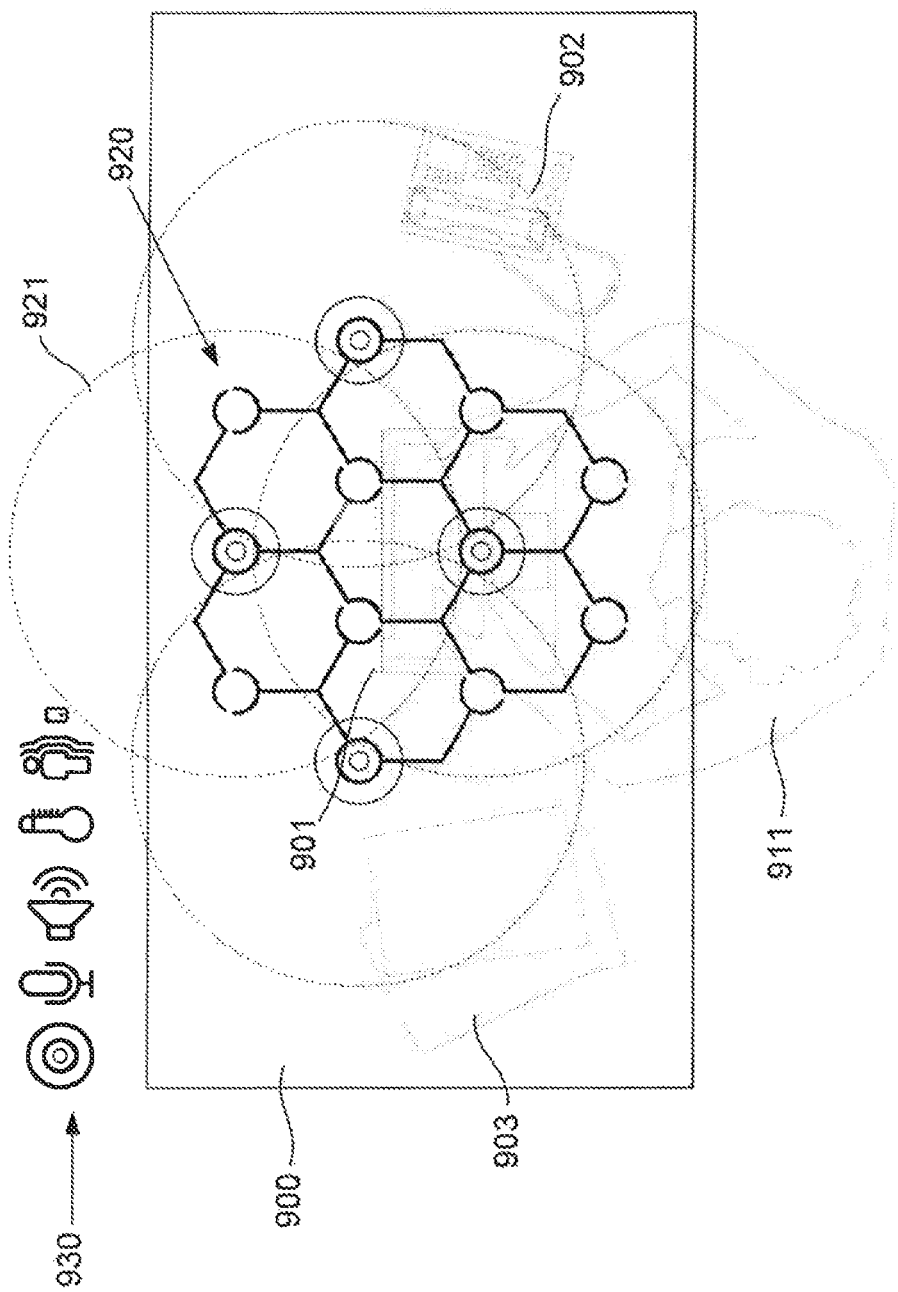

In the example of FIG. 9B, a larger desk 900 is used, with a computer 901 and additional phone 902 and workspace for documents 903, again used by a single user 911. An example suitable array 920 includes twelve array modules, positioned directly above the computer 901, and in this example include four more widely spaced lighting modules, as well as microphones, speakers, and temperature and proximity detection.

In the example of FIG. 9C, a wider desk 900 is used, with an array 920 including nineteen array modules, arranged to provide larger pools of services either side of a narrower central region.

In the example of FIG. 9D, a table 900 is used with a number of users 911 provided on either side of the table. Thirty seven array modules are provided, including eleven service modules, with four space along either side of the table and three along the middle, each including lighting, speakers, microphones, temperature and proximity detection, as well as video projection. The system is multi-user, allowing for even provision of services over the entire table, or for each workspace independently, depending on where users are present.

Accordingly, it will be appreciated from this that a variety of configurations can be provided, and that these can be designed by the user in accordance with their requirements, from standard components. In one particular example, this process is performed by a web services platform, in which a supplier hosts a website that allows the user to configure an array meeting their requirements.

In one example, this process could be performed by having the user specify requirements, such as the size of a desk, table or room, and having a server calculate a proposed array, which is then displayed, allowing a user to modify this as needed. Alternatively, the user can be presented with representation of available components, manipulating the representation to create an array with a desired configuration.

Once the array has been designed, the supplier can arrange for relevant components, including service devices 331, a controller 320, required cabling, any mounting brackets, or the like to be shipped to the user at step 805. In this example, simultaneously with this process, print files such as STL files, are generated and provided to the user at step 810, allowing the user to print array module housings at step 815. The supplied components are then incorporated into the array module housings at step 820 either after printing has been completed, or during the printing process depending on the requirements.

It will be appreciated that the above described delivery mechanism minimises transport requirements, allowing the bulky module housings to be easily manufactured onsite. However, this is not essential, and alternatively pre-made array modules 500, 600 can be manufactured and shipped to the user in a completed state.

Once each array module 500, 600 has been completed, the array modules can be interconnected to form the array 700, which is then installed at step 825, with the controller 320 being attached to the ceiling and then connected to the array 330 at step 830. The controller 320, which is typically shipped as part of the components, can be preconfigured with information regarding the configuration of the array 330. However, as users may install any module controllers in any one of the array modules 500, 600, more typically the controller 320 is adapted to poll the array module controllers 331.5 at step 835, allowing the controller 320 to determine the array configuration at step 840. This can be achieved using any suitable technique, such as by having the array module controllers communicate with each other to establish a nearest neighbour, with this information being used by the controller 320 to establish an overall physical configuration.

This process can be performed using known network topology mapping techniques and will not therefore be described in any detail.

At step 845 a user installs an App on a client device 310, such a smartphone. Once installed and relevant permissions provided, the App will identify any controllers 320 within communication at step 850. Connection to the controllers can be established either via direct point-to-point connections or alternatively could be achieved by having the controller 320 connected to a wireless network such as a Wi-Fi network and then connecting the client device 310 to the same network. It will be appreciated that to achieve this, a direct point-to-point connection may initially be required to allow relevant network settings to be defined for the controller 320, allowing the controller network access.

If multiple controllers 320 are available, details of these can be displayed, allowing the user to select the controller of interest at step 855. Once connected, the client device 310 and controller 320 synchronise at step 860, so that in future, the client device 310 and controller automatically connect, and allow the user to configure or use profiles as required.

Figure 10A:
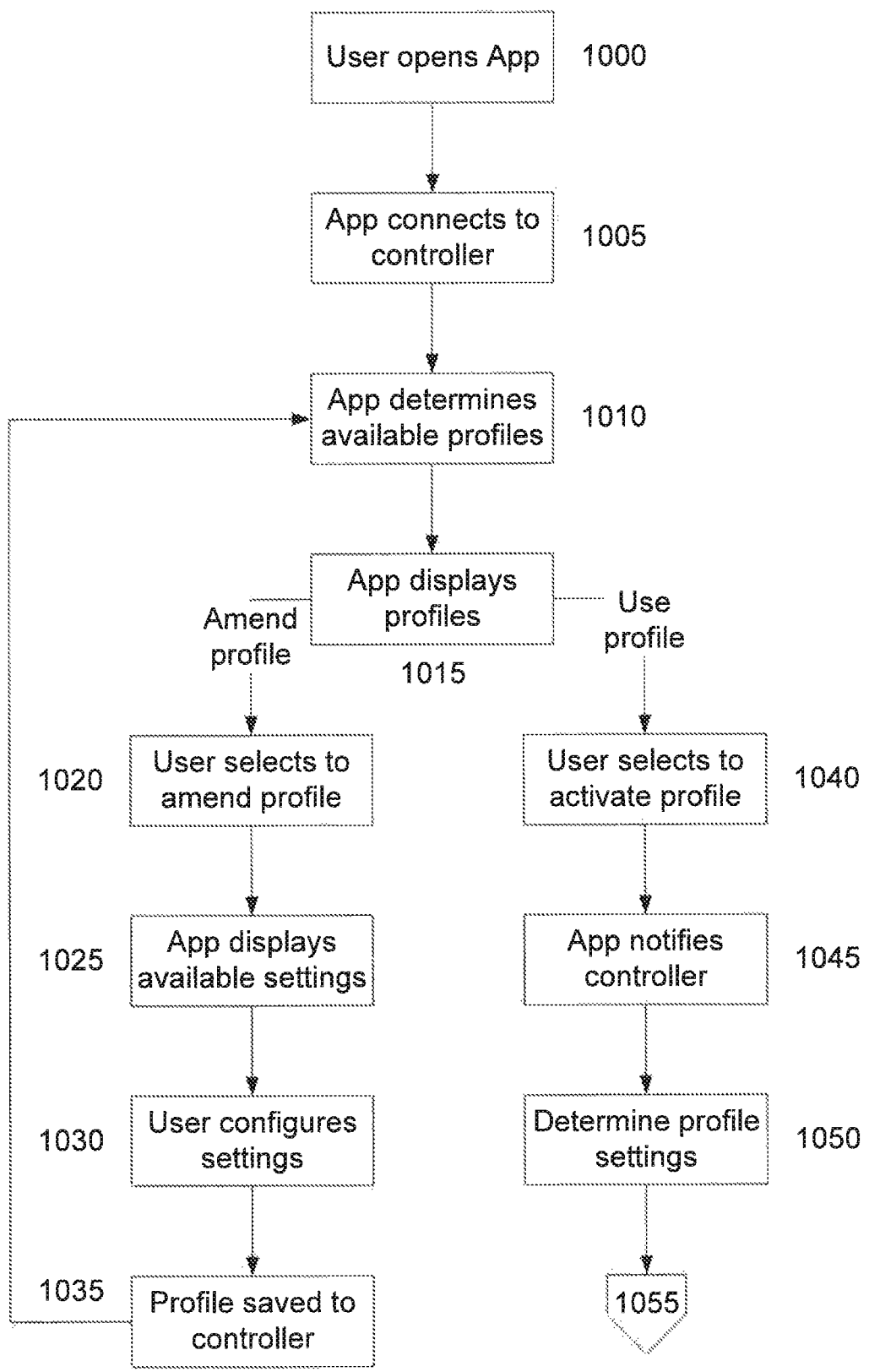
FIGS. 10A and 10B are a flowchart of a specific example of a method for controlling building services; and, FIG. 11 is a schematic diagram of an example user interface.
Figure 10B:
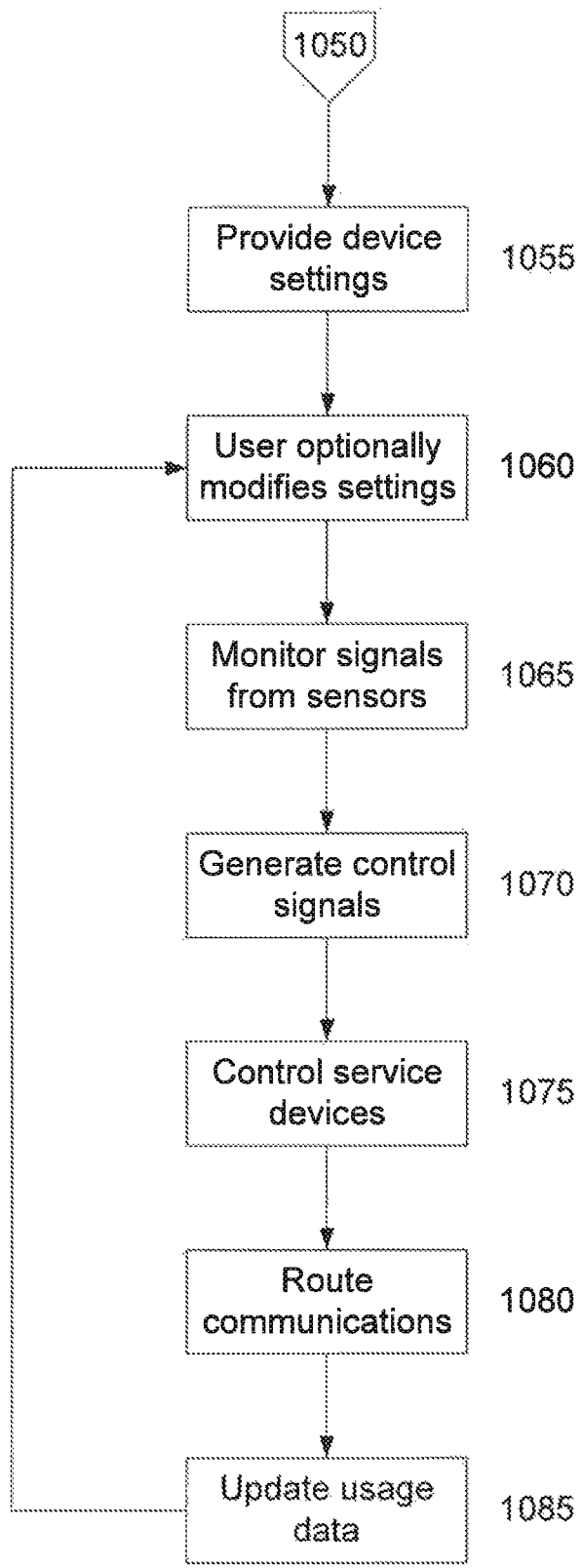

An example of the process of utilising of configuring profiles will now be described with reference to FIGS. 10A and 10B.

At step 1000, the user opens the App installed on their client device 310, which then connects to the controller 320 at step 1005. The controller 320 detects the connection to the client device 310, and accesses a list of available profiles stored in the memory 322, providing an indication of these to the client device at step 1010. The App displays available profiles to the user at step 1015, via a suitable user interface, allowing the user to select to amend or use a profile.

Figure 11:
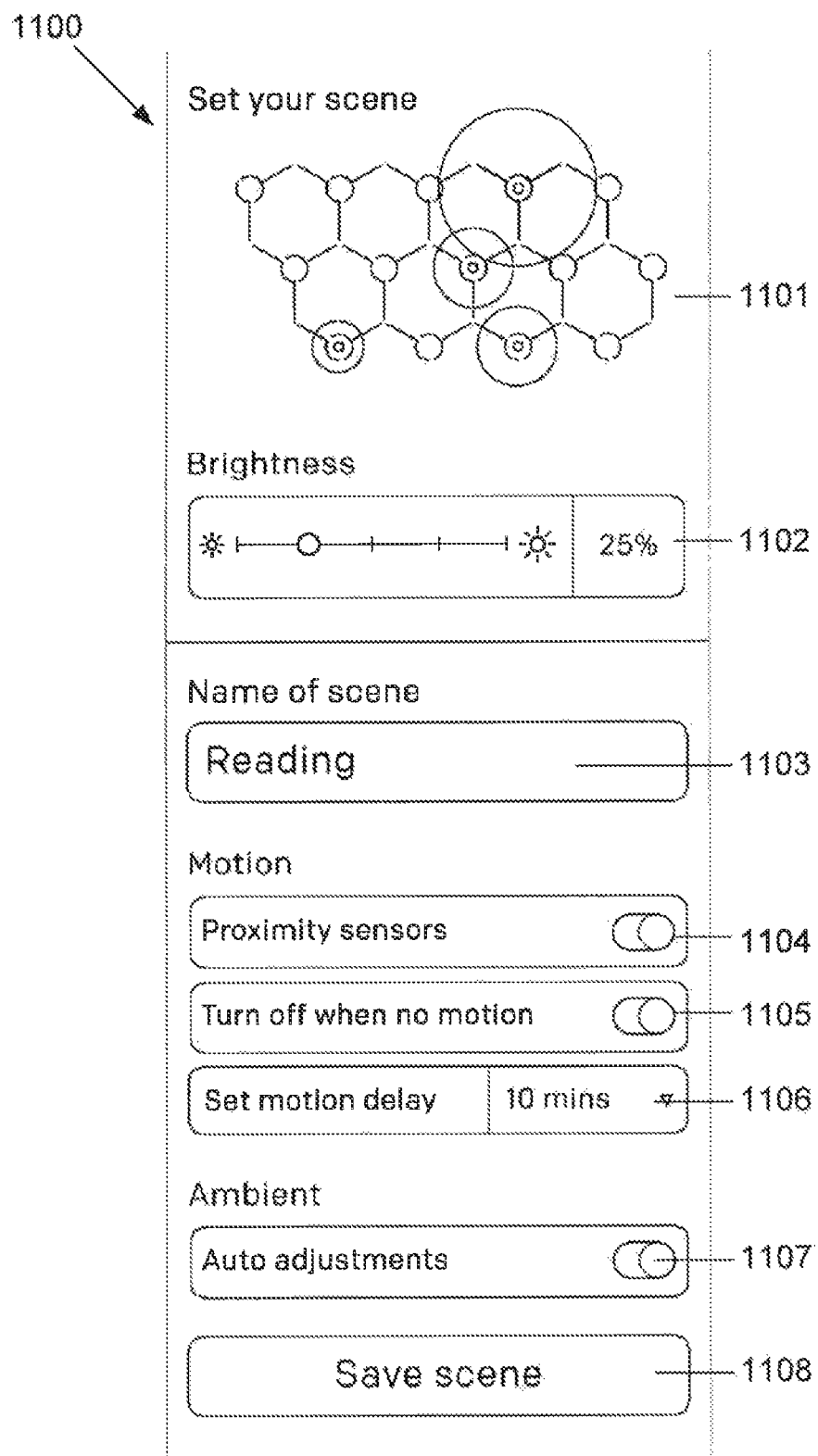

Assuming the user selects to amend a profile at step 1020, the App displays available settings associated with the selected profile. The process of amending a profile could also include creating a new profile, in which case default settings will simply be displayed. An example of the user interface when configuring settings at step 1030 is shown in FIG. 11.

In this example, the user interface 1100 includes a representation of the array 1101, allowing the user to view and select individual array modules, allowing the settings for each associated services device to be altered independently. In this example, the array includes lighting, and so a brightness setting 1102 is displayed, allowing the user to adjust the brightness of a currently selected lighting module. As this is adjusted the representation can be updated to reflect the enhanced brightness. It will also be appreciated that in the event that the array includes other service devices, such as microphones, speakers, or the like, similar controls could be provided for adjusting respective settings of these devices.

A name for the profile can be provided in a name field 1103, allowing the profile to be subsequently retrieved.

In this example, the array includes motion/proximity sensors, and so appropriate settings can be defined, including a sensor activation setting 1104 to turn the sensors on/off, a response setting 1105, to define the response to a lack of motion, and a timing 1106, to define a time period associated with the lack of motion. Auto light level adjustments 1107 can also be performed on the basis of ambient lighting conditions, as sensed by an ambient light sensor.

Once defined, the profile for reading is saved using a save scene option 1108, with the saved profile and associated settings being uploaded to controller 320 at step 1035, allowing the list of profiles to be updated as needed.

It will be appreciated from the above that the options displayed on the user interface will typically be customised based on the capabilities of the array, so for example, the option to configure motion sensors would not be present in the event that the array does not include motion sensing capabilities. This reduces the burden on the user to define relevant settings.

In the event that the user is using the profile, the user uses the App to select a profile to activate at step 1040, which causes the App to notify the controller 320 of the selected profile at step 1045. The controller determines the current device settings associated with the profile at step 1050, and provides an indication of these to the client device 310 at step 1055, allowing these to be optionally displayed and adjusted by the user at step 1060.

At step 1065, the controller 320 monitors signals from sensors, and determines from the signals and the current settings, how the service devices should be controlled. This allows the controller 320 to generate control signals at step 1070, which are provided to each of the individual module controllers 331.5, causing the service devices to be controlled at step 1075. During this process, the controller 320 will operate to route communications for example between the speakers or microphones and respective external systems, for example by passing data to external devices via a communications network, or by controlling a separate switching device, at step 1080. Usage data based on current power utilisation is recorded at step 1085, allowing this to be retrieved and displayed by the client device 310, on demand.

This process will then continue to repeat until as such time as a user selects an alternative profile or until some other layer in the system changes (i.e., ambient light, ambient temperature, meeting or work type, etc.).

Whilst the above described process has focussed on manual selection of the profile as needed, it will be appreciated that a similar process could be used to allow activation of profiles to be performed automatically. For example, this could involve creating a calendar entry relating to a particular type of meeting, such as a video conference, using a client device 310. In this situation, the type of meeting could be associated with a respective profile, either automatically or manually by a user. In this situation, when the meeting is due to occur, the client device 310 could provide an indication of the respective profile to the controller 320, allowing the controller 320 to activate the service devices, including setting the correct illumination and other device settings for a video conference.

It will also be appreciated that as part of the above described processes, the system can be configured to minimise energy usage when rooms are not in use, as determined either using proximity sensors, and/or based on scheduled times of usage for the rooms.

Accordingly, the above described system provides an integrated platform for user interface with multiple building systems or services. The platform can incorporate both software and hardware components that interact to provide for holistic control of building services, thereby providing a functionally and emotively unique user experience.

In one example, the implementation of holistic control is performed using profiles that can be focussed to ensure the environment is adapted to maximise productivity. For example, rather than controlling the lighting and air temperature separately, this can be performed collectively, based on intended usage of a room, determined by one or more of manual input, scheduling and on-board sensing. For example, this allows the nature of a meeting to be specified, with the services being controlled to achieve desired ambient conditions, such controlling the temperature, lighting, operation of equipment, or the like.

It will be appreciated that the system can be used in commercial and/or home environments, and the use of modular arrangements allows for a high degree of flexibility over the implementation, allowing this to be customised based on user requirements. In particular, this allows combinations of different services and sensors to be provided depending on the intended use of the system. Additionally, the use of an array in which a number of modules are integrated into a single physical structure allows the system to be easily and unobtrusively implemented in existing structures.

The system can also integrate intelligent software systems for controlling the services based on a combination of defined profiles and sensor inputs. The use of profiles allows complex combinations of settings to be implemented rapidly, whilst an intuitive user interface, displaying a representation of the physical configuration of the array, allows users to easily tailor profiles to meet their needs. Profiles can be selected purely manually, or can be triggered through automated processes, such as scheduling of meetings, video conferences or the like.

As a result, the above described systems provide a high degree of flexibility and control over building services, and hence the ambient conditions within a building, allowing these to be easily optimised to meet defined productivity and/or comfort goals.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A system for controlling building services, the system including:
  a) a services array supporting a collection of different types of service devices, each type for providing a respective service;
  b) an electronic controller that communicates with a client device to:
    i) determine a selected profile defining service device settings associated with each of all the different types of service devices supported by the services array, the service device settings for enabling the collection of service devices to provide a desired condition; and,
    ii) control the collection of service devices supported by the services array in accordance with the service device settings defined by the profile to thereby at least partially control building services to provide the desired condition.

2. A system according to claim 1, wherein the client device:
  a) determines the selected profile in accordance with user input commands; and,
  b) provides an indication of the selected profile to the controller, the controller being responsive to the indication to determine service device settings.

3. A system according to claim 2, wherein profiles are stored in the controller and wherein the client device:
  a) communicates with the controller to determine available profiles;
  b) displays an indication of the available profiles to a user; and,
  c) determines user selection of one of the available profiles in accordance with user input commands.

4. A system according to claim 1, wherein the client device:
  a) determines a scheduled event using an event scheduler;
  b) determines a profile associated with the selected event; and,
  c) provides an indication of the selected profile to the controller, the controller being responsive to the indication to determine service device settings.

5. A system according to claim 1, wherein the client device:
  a) displays an indication of device settings to a user;
  b) determines modification of device settings in accordance with user input commands; and,
  c) provides an indication of service device settings to the controller in accordance with any modifications.

6. A system according to claim 5, wherein the client device:
  a) provides an indication of the selected profile to the controllers; and,
  b) receives an indication of device settings associated with the selected profile from the controller.

7. A system according to claim 1, wherein the client device:
  a) displays a representation of the services array; and,
  b) determines device settings at least partially in accordance with user interaction with the representation of the services array.

8. A system according to claim 7, wherein the service devices in the services array are provided in a defined relative location and wherein the representation is indicative of the defined relative location.

9. A system according to claim 1, wherein the service devices in the services array are provided in a known relative location and wherein the controller:
  a) communicates with service devices in the services array; and,
  b) determines the defined relative location based on an outcome of the communication.

10. A system according to claim 1, wherein the types of service devices include at least one of:
  a) lighting modules;
  b) speakers;
  c) microphones, and,
  d) at least one video display unit.

11. A system according to claim 10, wherein the service device settings include at least one of:
  a) for lighting modules, at least one of a colour, brightness, hue, intensity, luminosity and pattern of illumination;
  b) for speakers, at least one of:
    i) a speaker volume; and,
    ii) a speaker source;
  c) for microphones:
    i) a microphone sensitivity; and
    ii) a microphone destination.

12. A system according to claim 10, wherein the lighting modules include LED lighting modules.

13. A system according to claim 1, wherein the system further controls at least one building service device provided remotely from the services array.

14. A system according to claim 13, wherein the controller communicates wirelessly with the at least one building service device.

15. A system according to claim 1, wherein the system includes at least one sensor, and wherein the system controls the service devices at least partially in accordance with signals from the at least one sensor.

16. A system according to claim 15, wherein the profile further defines sensor dependent service device settings, and wherein the controllers:
   a) receive one or more signals from the at least one sensor, each signal being indicative of a sensor reading;
   b) for each service device type having service device settings which are dependent on
   the one or more sensed signals, determines a service device setting in accordance with
   the received one or more signals; and
   c) controls the service devices according to the determined service device setting.

17. A system according to claim 15 wherein the at least one sensor includes at least one of:
   a) a gesture sensor;
   b) a proximity sensor;
   c) a temperature sensor;
   d) a light sensor; and,
   e) an electrical power sensor.

18. A system according to claim 1, wherein the controller:
   a) determines an energy usage; and,
   b) at least one of:
      i) provides an indication of the energy usage to the client device, the client device being adapted to display an energy usage indicator to a user, the energy usage indicator being indicative of at least one of:
         (1) current energy usage;
         (2) historical energy usage; and,
         (3) a cost associated with energy usage; and,
      ii) controls at least one service device in accordance with the energy usage.

19. A system according to claim 1, wherein the service array is adapted to be suspended from a building ceiling.

20. A system according to claim 19, wherein the controller is provided in a controller housing coupled to at least one of:
   a) the ceiling; and,
   b) the services array.

21. A system according to claim 20, wherein the controller housing includes an AC/DC converter for supplying DC power to service devices in the services array.

22. A system according to claim 1, wherein the controller includes:
   a) at least one electronic processing device; and,
   b) a memory for storing profiles.

23. A system according to claim 1, wherein the services array includes a frame for supporting the collection of service devices.

24. A system according to claim 23, wherein each array module supports at least one of the following service device types:
   a) lighting module;
   b) speaker, and,
   c) microphone.

25. A system according to claim 23, wherein each array module includes an array housing having:
   a) a hub that supports at least one service device; and,
   b) one or more arms for connecting the array module to one or more other array modules.

26. A system according to claim 23, wherein at least part of each array module is manufactured onsite at least in part using additive manufacturing.

27. A system according to claim 23, wherein each array module includes:
   a) control electronics that controls the at least one service device; and,
   b) at least one connector for electrically connecting the control electronics to at least one of:
      i) other array modules; and,
      ii) the controller.

28. A system according to claim 1, wherein the services array includes a plurality of interconnected array modules.

29. A method of controlling building services to provide a desired condition, the method including:
   a) providing a services array supporting a collection of different types of service devices, each type for providing a respective service; and
   b) providing an electronic controller that communicates with a client device to:
      i) determine a selected profile defining service device settings associated with each of all the different types of service devices supported by the services array, the service device settings for enabling the collection of service devices to provide a desired condition; and,
      ii) control the collection of service devices supported by the services array in accordance with the service device settings defined by the profile, to thereby
      at least partially control building services to provide the desired condition.

\* \* \* \* \*